(12) United States Patent
Peng et al.

(10) Patent No.: US 11,988,867 B2
(45) Date of Patent: May 21, 2024

(54) PACKAGE STRUCTURE HAVING PHOTONIC INTEGRATED CIRCUIT

(71) Applicant: Molex, LLC, Lisle, IL (US)

(72) Inventors: Chih-Wei Peng, Hsinchu (TW); Chih-Chung Hsu, Hsinchu (TW); Chih-Chung Wu, Hsinchu (TW); Zuon-Min Chuang, Taoyuan (TW)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 17/395,496

(22) Filed: Aug. 6, 2021

(65) Prior Publication Data
US 2022/0050245 A1    Feb. 17, 2022

(30) Foreign Application Priority Data

Aug. 11, 2020 (CN) .......................... 202010800803.0

(51) Int. Cl.
*G02B 6/12* (2006.01)
*G02B 6/42* (2006.01)
*G02B 6/30* (2006.01)

(52) U.S. Cl.
CPC ......... *G02B 6/12004* (2013.01); *G02B 6/424* (2013.01); *G02B 6/4244* (2013.01); *G02B 6/4245* (2013.01); *G02B 2006/12102* (2013.01); *G02B 6/30* (2013.01); *G02B 6/4206* (2013.01)

(58) Field of Classification Search
CPC .... G02B 6/12004; G02B 6/30; G02B 6/4208; G02B 6/424; G02B 6/4244; G02B 6/4245
See application file for complete search history.

(56) References Cited

U.S. PATENT DOCUMENTS

| | | | |
|---|---|---|---|
| 4,188,708 A | 2/1980 | Frederiksen | |
| 5,199,087 A | 3/1993 | Frazier | |
| 6,205,264 B1 | 3/2001 | Jin et al. | |
| 6,438,291 B1 | 8/2002 | Duck et al. | |
| 7,005,719 B2* | 2/2006 | Masumoto | G02B 6/4253 257/432 |
| 7,931,411 B2* | 4/2011 | Kurita | G02B 6/4201 385/88 |
| 8,039,739 B1 | 10/2011 | Capps et al. | |
| 8,231,284 B2* | 7/2012 | Doany | G02B 6/43 385/33 |
| 10,001,611 B2* | 6/2018 | Ding | H01L 23/48 |
| 10,921,534 B2* | 2/2021 | Dong | G02B 6/4257 |
| 11,353,668 B2* | 6/2022 | Erickson | G02B 6/13 |
| 2009/0185808 A1* | 7/2009 | Kishima | G02B 6/43 398/118 |

(Continued)

FOREIGN PATENT DOCUMENTS

| CN | 1048104 A | 12/1990 |
|---|---|---|
| CN | 1655342 A | 8/2005 |

(Continued)

*Primary Examiner* — Daniel Petkovsek

(57) ABSTRACT

The present disclosure provides a package structure having a photonic integrated circuit, the package structure includes a substrate, a chip and an optical module. The chip has an optical waveguide structure and a recessed portion. The optical waveguide structure is adjacent to the recessed portion. The recessed portion faces the substrate, and the chip is engaged to the substrate by flip chip. The optical module is provided in the recessed portion of the chip.

11 Claims, 13 Drawing Sheets

(56) References Cited

U.S. PATENT DOCUMENTS

| | | | |
|---|---|---|---|
| 2012/0207426 A1* | 8/2012 | Doany | G02B 6/426 |
| | | | 257/E33.056 |
| 2013/0182997 A1 | 7/2013 | Fujiwara et al. | |
| 2018/0081118 A1 | 3/2018 | Klamkin et al. | |
| 2021/0141170 A1* | 5/2021 | Ueda | G02B 6/425 |

FOREIGN PATENT DOCUMENTS

| | | | | |
|---|---|---|---|---|
| CN | 107076933 A | 8/2017 | | |
| CN | 107111060 A | 8/2017 | | |
| CN | 206546453 U | 10/2017 | | |
| CN | 108666281 A | 10/2018 | | |
| CN | 211045437 U | 7/2020 | | |
| DE | 102019211002 A1 * | 1/2021 | ......... | G02B 6/12004 |
| TW | 201941382 A | 10/2019 | | |
| WO | WO-2019202895 A1 * | 10/2019 | ......... | G02B 6/12004 |

* cited by examiner

PACKAGE STRUCTURE HAVING PHOTONIC INTEGRATED CIRCUIT

RELATED APPLICATIONS

The present application claims priority to Chinese Patent Application No. 202010800803.0 filed Aug. 11, 2020 which is incorporated by reference in its entirety.

TECHNICAL FIELD

The present disclosure relates to a package structure having a photonic integrated circuit. Furthermore, the present disclosure relates to a package structure in which an optical module is provided in a photonic integrated circuit.

BACKGROUND

FIG. 1 is a schematic view of an existing package structure. As shown in FIG. 1, the package structure has a chip 10, an optical module 20, a carrier 30 and a circuit board 40. The chip 10 and the optical module 20 are adjacent to each other and are adhered to the carrier 30, for example, by a resin, a back plate 41, which is ceramic or silicon in material, is adhered on a back surface of the circuit board 40, for example, by a resin, and the back plate 41 is at least partially exposed from an opened region of the circuit board 40, the carrier 30 is adhered and fixed to the back plate 41 exposed from the opened region of the circuit board 40, for example, by a resin, and a circuit on the circuit board 40 is correspondingly provided around the carrier 30. The opened region of the circuit board 40 is used to lower a height that the chip 10 and the optical module 20 protrude from the circuit board 40 after the chip 10 and the optical module 20 are provided to the circuit board 40.

In the existing package structure, because a thickness of the optical module 20 is generally larger than a thickness of the chip 10, in order to provide the optical module 20, the chip 10 and the optical module 20 are carried by the carrier 30 at the same time, the chip 10 and the optical module 20 are engaged with the circuit on the circuit board 40 by wire bonding.

However, because the chip 10 and the optical module 20 are engaged with the circuit on the circuit board 40 by wire bonding, a radio frequency (RF) performance of the package structure will be affected by a length of a bonding wire. That is, positions of the circuits on the circuit board 40, the chip 10, and the optical module 20 must be more precise. If relative position and design are slightly different, the length of the bonding wire may become different, and in turn the radio frequency performance of the package structure 1 may be affected. In other words, in the existing package structure, a fault tolerance rate for the circuit on the circuit board 40, the chip 10 and the optical module 20 is lower. In addition, the chip 10 and the optical module 20 are adhered and fixed to the carrier 30 and the carrier 30 is adhered and fixed to the back plate 41 which is positioned on the back surface of the circuit board 40. After the chip 10, the optical module 20 and the carrier 30 are adhered and fixed, it is more difficult for the chip 10, the optical module 20 and the carrier 30 to re-separate and engage, and also causes a problem that the existing structure is difficult to rework.

Furthermore, because the chip 10 and the optical module 20 are adjacent to each other and are provided on the carrier 30, an electrical signal of the chip 10 and an electrical signal of the optical module 20 may also cause problems, such as crosstalk and the like. In addition, in the existing package structure, it needs to provide an optical fiber for an optical path of an incident light and an optical fiber for an optical path of an emitted light, which will make the cost increased.

The above description of the "background" merely provides a background, and it is not admitted that the above description of "background" discloses the subject matter of the present disclosure, and the above description of "background" does not constitute the background of the present disclosure, any above description of the "background" should not be considered as any part of the present disclosure.

SUMMARY

An embodiment of the present disclosure provides a package structure which a substrate, a chip and an optical module. The chip has an optical waveguide structure and a recessed portion. The optical waveguide structure is adjacent to the recessed portion. The recessed portion faces the substrate, the chip is engaged to the substrate by flip chip. The optical module is provided in the recessed portion of the chip.

In some embodiments, the substrate has an optical module recessed portion, and the optical module extends into the optical module recessed portion.

In some embodiments, the optical module comprises a light source and a lens, a light generated by the light source passes through the lens and then is incident to the optical waveguide structure of the chip.

In some embodiments, the chip is a flip-chip type photonic integrated circuit.

In some embodiments, the chip is connected with an optical waveguide connection assembly.

In some embodiments, the substrate has an optical waveguide connection assembly recessed portion, and the optical waveguide connection assembly extends into the optical waveguide connection assembly recessed portion.

An embodiment of the present disclosure provides another package structure which comprises a substrate, a first chip, a second chip, a third chip and an optical module. The first chip is engaged to the substrate by flip chip. The second chip is engaged to the substrate by flip chip and is spaced apart from the first chip. The third chip is provided on the first chip and the second chip. The optical module is provided to the third chip and positioned between the substrate and the third chip.

In some embodiments, the third chip has a recessed portion which faces the substrate and is positioned between the first chip and the second chip, and the optical module is positioned in the recessed portion.

In some embodiments, the substrate has an optical module recessed portion, and the optical module extends into the optical module recessed portion.

In some embodiments, the optical module comprises a light source and a lens, a light generated by the light source passes through the lens and then is incident to the first chip, the second chip or the third chip.

In some embodiments, the third chip is connected with an optical waveguide connection assembly.

In some embodiments, the substrate has an optical waveguide connection assembly recessed portion, and the optical waveguide connection assembly extends into the optical waveguide connection assembly recessed portion.

In the present disclosure, the chip of the package structure is engaged to the substrate by flip chip, and the optical module is provided between the substrate and the chip. Therefore, because the chip of the package structure is connected by that the chip of the package structure is engaged by flip chip, the problem that the radio frequency performance is affected by the length of the bonding wire when wire bonding is used can be avoided. That is, an error tolerance rate of the chip, the optical module and the substrate in the package structure is higher than the error tolerance rate of the existing package structure in relative position. After the package structure packages the substrate, the chip and the optical module, the package structure does not need to be fixed to the other circuit board via a carrier but is directly connected with the other circuit board, in other words, the package structure of the present disclosure and the other circuit board is more easier to re-separate and engage, that is, is easier to rework than the existing package structure.

In addition, in the package structure of the present disclosure, the optical module is, for example, provided in the recessed portion, so an electrical signal path of the optical module can be different from an electrical signal path of the chip to avoid generation of crosstalk. Moreover, the package structure of the present disclosure does not need to provide an optical fiber for an optical path of an incident light and an optical fiber for an optical path of an emitted light, so that the cost is decreased.

The technical features and advantages of the present disclosure are widely and generally described as above, so the detailed description of the present disclosure can be better understood. Other technical features and advantages constituting the subject matters of the claims of the present disclosure will be described below. It is to be understood by those of ordinary skill in the art that, the concept and specific embodiments disclosed below may be quite easily used to make modification or design other configuration or manufacturing method to realize the same objects of the present disclosure. It is to be understood by those of ordinary skill in the art that these equivalent configurations cannot depart from the spirit and scope of the present disclosure as defined by the appended claims.

BRIEF DESCRIPTION OF THE DRAWINGS

Referring to the detailed description and the claims in combination with the drawings, the disclosed contents of the present disclosure can be fully understood, the same reference numeral indicates the same element in the drawings.

DETAILED DESCRIPTION OF THE PREFERRED EMBODIMENTS

Figure 1:
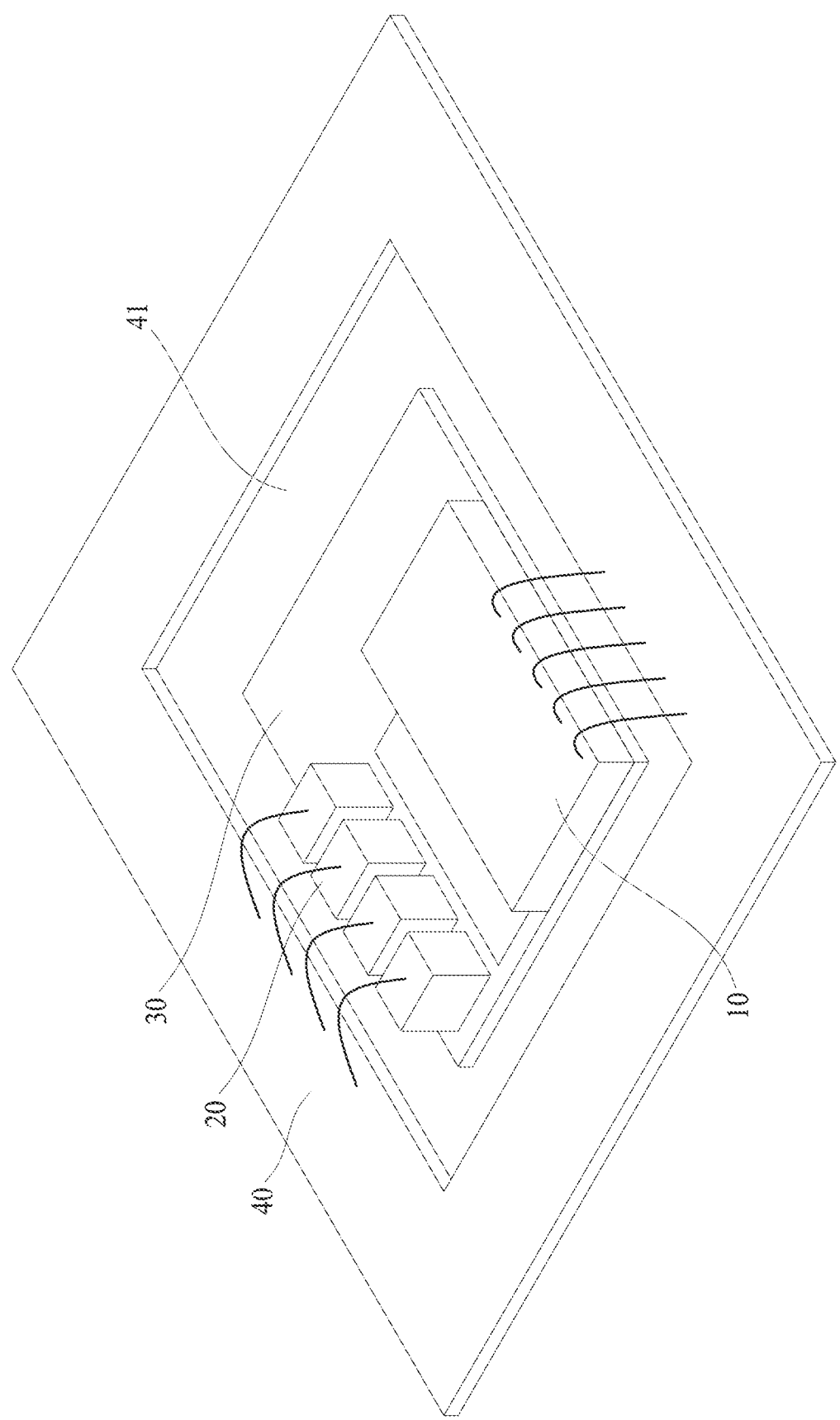
FIG. 1 is a schematic view of an existing package structure.

Embodiments or examples of the content of the present disclosure shown in the drawings are described in a specific language. It is to be understood that this is not intended to limit the scope of the present disclosure. Any variations or modifications of the described embodiments, as well as any further applications of the principles described herein, will normally occur to those skilled in the art. The reference numerals may be repeated in each embodiment, but even if the elements have the same reference numeral, the features in the embodiment are not necessarily used in another embodiment.

It will be understood that the various elements, assemblies, regions, layers or sections may be described herein using the terms first, second, third, etc., however, these elements, assemblies, regions, layers or sections are not limited to these terms. These terms are only used to distinguish one element, assembly, region, layer or section from another element, assembly, region, layer or section. The first element, assembly, region, layer or section described below may be referred to as a second element, assembly, region, layer or section without departing from the teachings of the inventive concept of the present disclosure.

The words used in the present disclosure are only used for the purpose of describing the specific exemplary embodiments and are not intended to limit the concept of the present disclosure. As used herein, "a/an" and "the" in singular are also used to contain plural, unless otherwise expressly indicated herein. It is to be understood that the word "include" used in the specification specifically indicates the existence of a feature, integer, step, operation, element or assembly which is described, but does not excludes the existence of one or more other features, integers, steps, operations, elements, assemblies or groups thereof.

Figure 2:
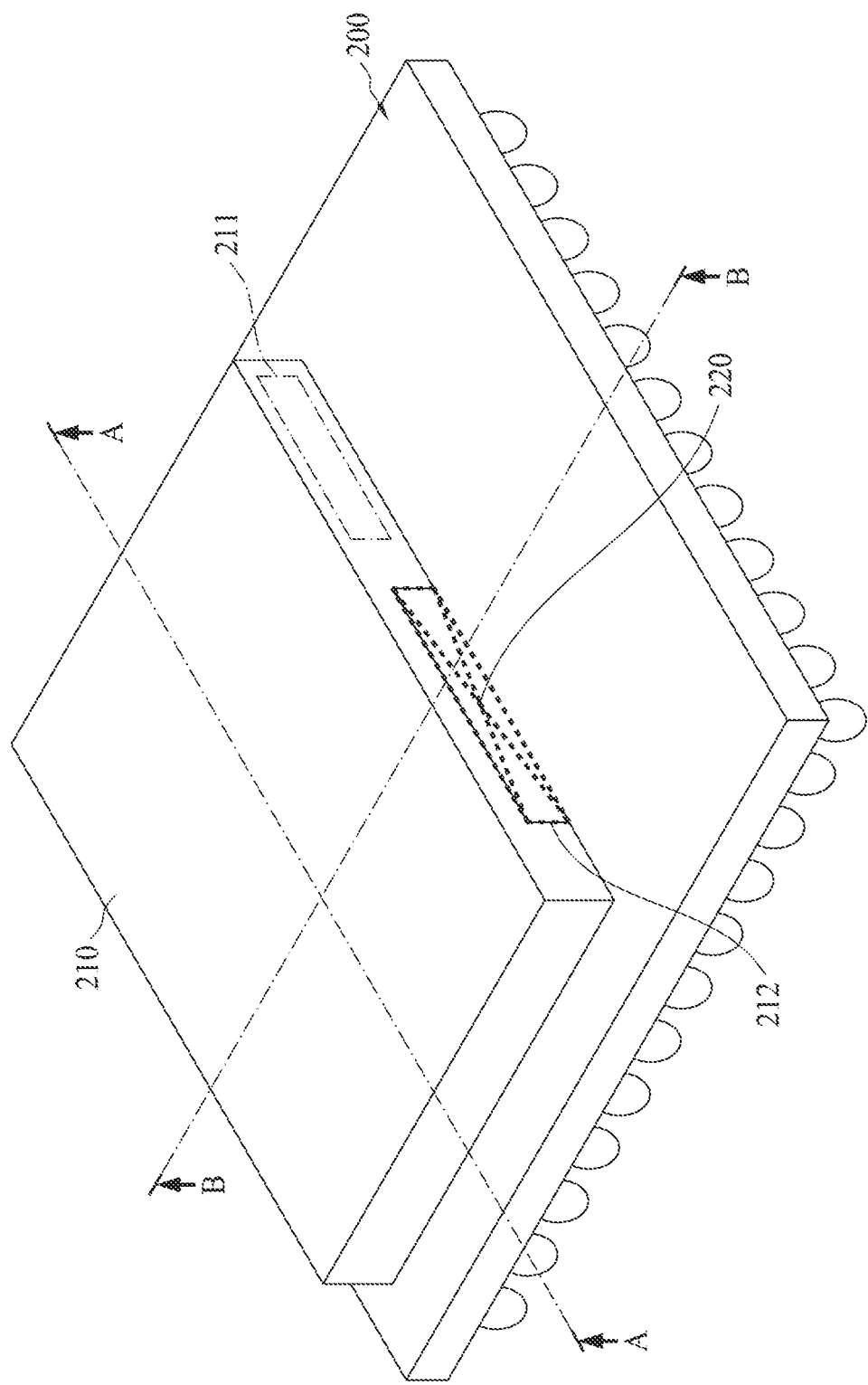
FIG. 2 is a perspective schematic view of a package structure of the present disclosure.
Figure 3A:
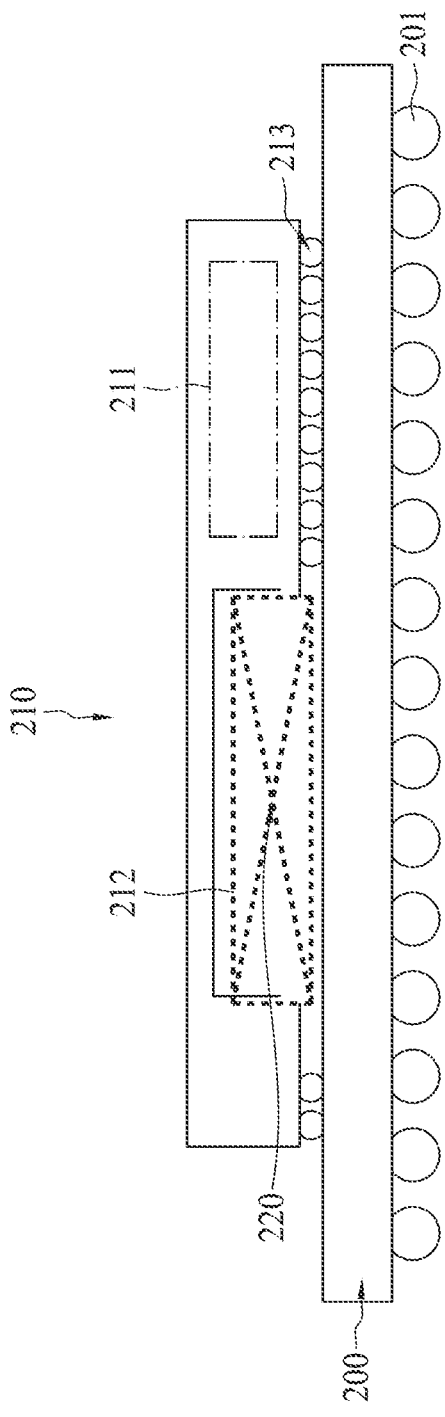
FIG. 3A is a cross-sectional view of the package structure taken along a line A-A of FIG. 2.
Figure 3B:
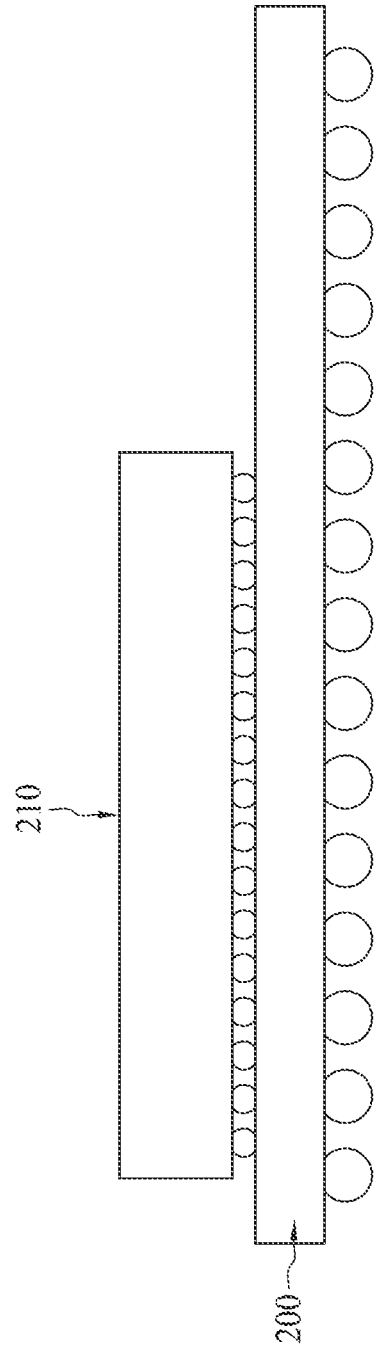
FIG. 3B is a cross-sectional view of the package structure taken along a line B-B in FIG. 2.

FIG. 2 is a perspective schematic view of a package structure 2 of the present disclosure, FIG. 3A is a cross-sectional view of the package structure 2 taken along a line A-A of FIG. 2, and FIG. 3B is a cross-sectional view of the package structure 2 taken along a line B-B in FIG. 2.

As shown in FIG. 2, FIG. 3A and FIG. 3B, in some embodiments, the package structure 2 includes a substrate 200, a chip 210 and an optical module 220. For example, the substrate 200 is a circuit board, the circuit board has a circuit structure, the circuit structure may be for example but not limited to a multilayer circuit structure or other suitable circuit structures. In some embodiments, a plurality of bumps or solder balls 201 may be provided on the substrate 200 on a surface of the substrate 200 opposite to a surface on which the chip 210 is provided, so that the package structure 2 can be electrically connected with other elements.

The chip 210 has an optical waveguide structure 211 and a recessed portion 212. The optical waveguide structure 211 is adjacent to the recessed portion 212, and the recessed portion 212 faces the substrate 200. In other words, the recessed portion 212 is positioned between the chip 210 and the substrate 200, and the optical waveguide structure 211 is positioned at a side of the recessed portion 212. Furthermore, a shape of the recessed portion 212 is not intended as limitation, and the recessed portion 212 may be an elongated groove shape and extends through two sides of the chip 210 (as shown in FIG. 3A, the chip 210 is n-shaped), or may be a recessed groove shape which does not extend through the two sides of the chip 210. In addition, it is noted that a structure of the optical waveguide structure 211 is not intended as limitation. The chip 210 is engaged to the substrate 200 by flip chip. In some embodiments, a plurality of micro bumps or micro solder balls 213 are provided between the chip 210 and the substrate 200 to electrically connect the chip 210 and the substrate 200. For example, the chip 210 may be a flip-chip type photonic integrated circuit (PIC).

The optical module 220 is provided in the recessed portion 212 of the chip 210. The optical module 220 is positioned between the chip 210 and the substrate 200 and is electrically connected with the chip 210 and the substrate 200. In some embodiments, the optical module 220 may be electrically connected with the substrate 200 via the chip 210, that is, the optical module 220 is provided to the chip 210 and is electrically connected to the substrate 200 via that the chip 210 is engaged to the substrate 200 by flip chip.

Figure 4A:
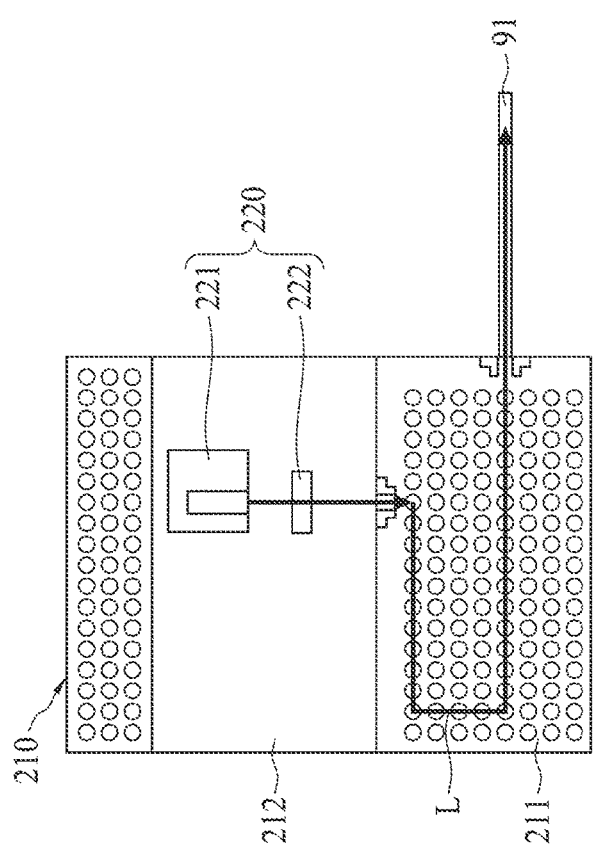
FIG. 4A is a bottom view of a chip and an optical module of the present disclosure.
Figure 4B:
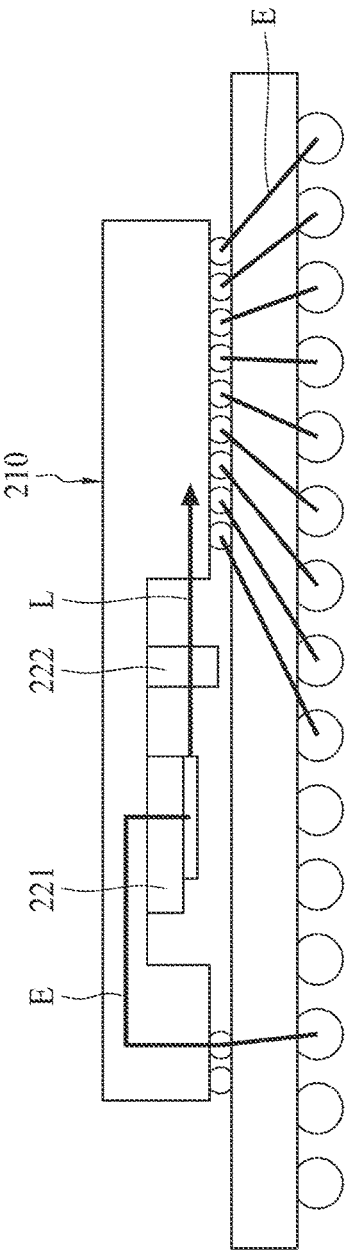
FIG. 4B is a side view of the chip and the optical module of the present disclosure.

FIG. 4A is a bottom view of a chip 210 and an optical module 220 of the present disclosure, FIG. 4B is a side view of the chip 210 and the optical module 220 of the present disclosure. As shown in FIG. 4A, in some embodiments, the optical module 220 may have a light source 221 and a lens 222, and the light source 221 and the lens 222 are provided in the recessed portion 212. The light generated by the light source 221 may be incident to the optical waveguide structure 211 of the chip 210 along an optical path L via the lens 222, and be emitted to an external element (for example, an optical fiber 91) connected with the chip 210. As shown in FIG. 4B, the light source 221 of the optical module 220 is electrically connected with the substrate 200 (for example, along a path E) via that the chip 210 is engaged to the substrate 200 by flip chip. For example, the light source 221 may be a laser diode or a light emitting diode.

In conclusion, in the present disclosure, the chip 210 of the package structure 2 is engaged to the substrate 200 by flip chip, and the optical module 220 is provided between the substrate 200 and the chip 210. Therefore, because the chip 210 of the package structure 2 is connected by that the chip 210 of the package structure 2 is engaged by flip chip, the problem that the radio frequency performance is affected by the length of the bonding wire when wire bonding is used can be avoided. That is, an error tolerance rate of the chip 210, the optical module 220 and the substrate 200 in the package structure 2 is higher than the error tolerance rate of the existing package structure 1 (as shown in FIG. 1) in relative position.

Figure 3C:
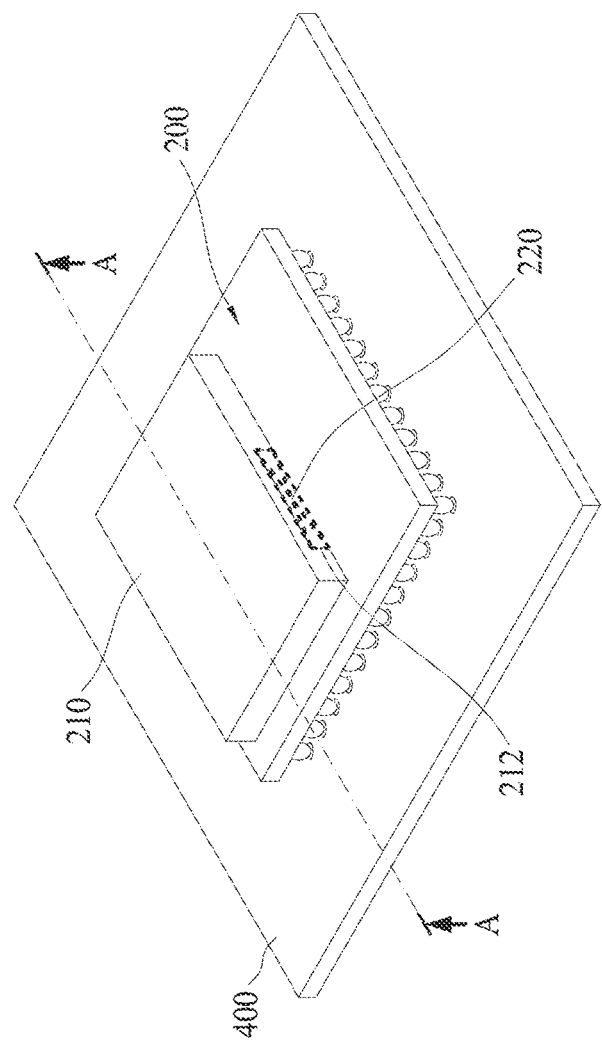
FIG. 3C is a perspective schematic view of a package structure engaged with a circuit board according to the present disclosure.
Figure 3D:
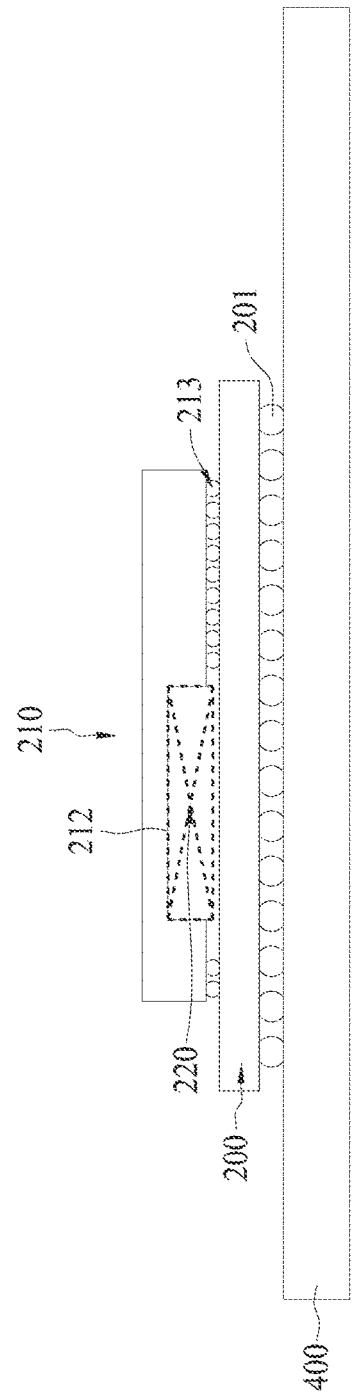
FIG. 3D is a cross-sectional view of the package structure taken along a line A-A of FIG. 3C.

FIG. 3C is a perspective schematic view of a package structure 2 engaged with a circuit board 400 according to the present disclosure, FIG. 3D is a cross-sectional view of the package structure 2 taken along a line A-A in FIG. 3C. As shown in FIG. 3C and FIG. 3D, the package structure 2 does not need to be fixed to the circuit board 400 via a carrier, and the degree of freedom of reworking of the package structure 2 can also be increased.

In addition, in the package structure 2 of the present disclosure, the optical module 220 is, for example, provided in the recessed portion 212, so an electrical signal path of the optical module 220 (for example, the path E on the left side of FIG. 4B) can be different from an electrical signal path of the chip 210 (for example, a path E on the right side of FIG. 4B) to avoid generation of crosstalk. Moreover, the package structure 2 of the present disclosure does not need to provide an optical fiber for an optical path of an incident light and an optical fiber for an optical path of an emitted light, so that the cost is decreased.

Figure 5A:
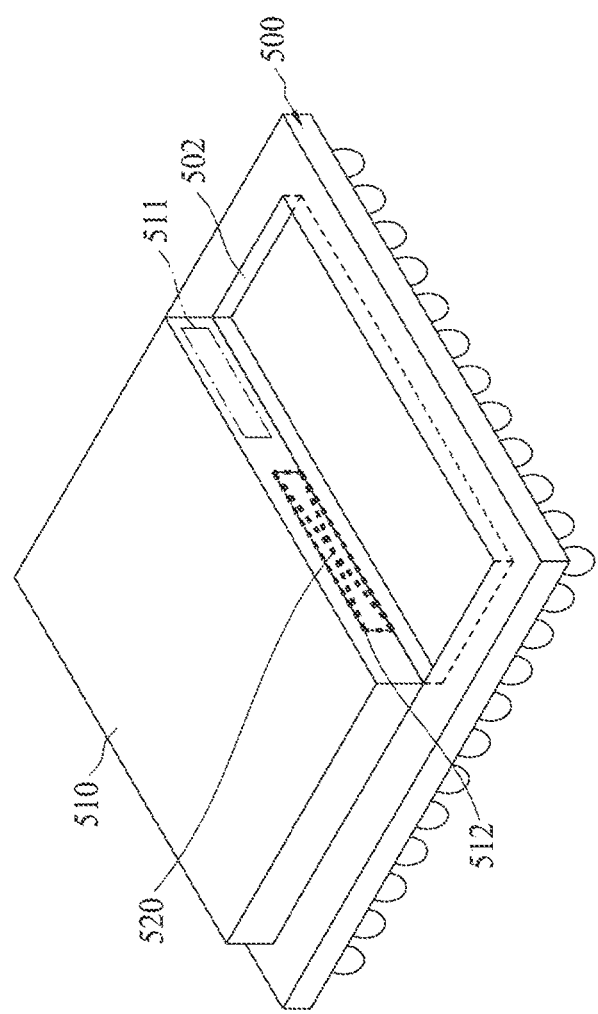
FIG. 5A is a schematic view of another package structure of the present disclosure.
Figure 5B:
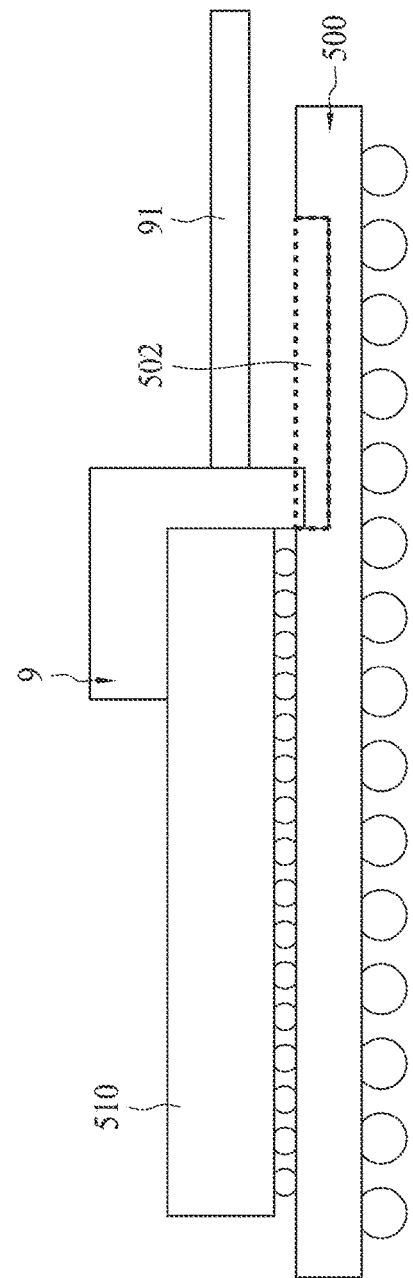
FIG. 5B is a schematic view of a connection manner of the package structure shown in FIG. 5A and an optical waveguide connection assembly.

FIG. 5A is a schematic view of another package structure 5 of the present disclosure, FIG. 5B is a schematic view of a connection manner of the package structure 5 shown in FIG. 5A and an optical waveguide connection assembly 9. In some embodiments, the optical waveguide connection assembly 9 is connected with the chip 510 in form of being suspended on the chip 510.

As shown in FIG. 5A and FIG. 5B, the package structure 5 includes a substrate 500, a chip 510 and an optical module 520. The chip 510 and the optical module 520 are similar to the chip 210 and the optical module 220 in FIG. 2, FIG. 3A, FIG. 3B, FIG. 4A and FIG. 4B in structure, and will not be repeatedly described herein.

A difference between the package structure 5 and the package structure 2 of FIG. 2, FIG. 3A, FIG. 3B, FIG. 4A and FIG. 4B lies in that, the substrate 500 has an optical waveguide connection assembly recessed portion 502, the optical waveguide connection assembly recessed portion 502 does not overlap with the chip 510 in a top view, and the optical waveguide connection assembly recessed portion 502 is not covered by the chip 510. However, this is not intended as limitation, the optical waveguide connection assembly recessed portion 502 also may be partially covered by the chip 510, that is, the optical waveguide connection assembly recessed portion 502 is at least partially provided outside a region on the substrate 500 where the substrate 500 overlaps with the chip 510.

Therefore, in addition to that the package structure 5 has the above functions as the package structure 2, when a size of the optical waveguide connection assembly 9 is larger and the optical waveguide connection assembly 9 can be connected with the chip 510 in form of being suspended by means of the optical waveguide connection assembly recessed portion 502 of the substrate 500, the optical waveguide connection assembly 9 is not affected by the substrate 500 and can extend into the optical waveguide connection assembly recessed portion 502 of the substrate 500, so that it can avoid the optical waveguide connection assembly 9 contacting the substrate 500, and can allow an optical fiber 91 of the optical waveguide connection assembly 9 to be more accurately mated with an optical waveguide structure 511 of the chip 510. It is noted that, when the size of the optical waveguide connection assembly 9 is smaller (for example, the optical waveguide connection assembly 9 does not extend to the substrate 500), it does not need to provide the optical waveguide connection assembly recessed portion 502.

Figure 6A:
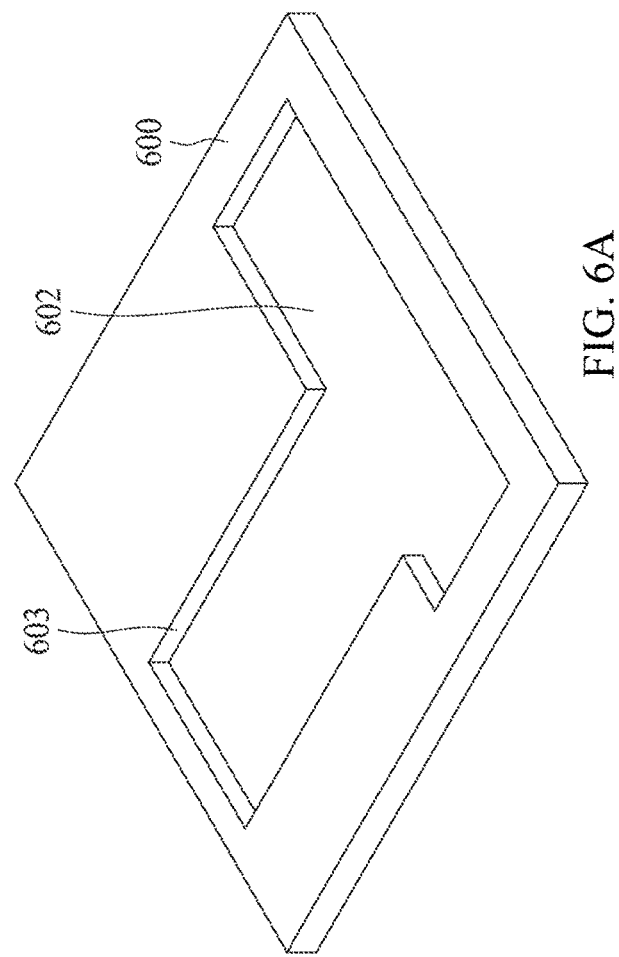
FIG. 6A is a schematic view of another substrate of the present disclosure.
Figure 6B:
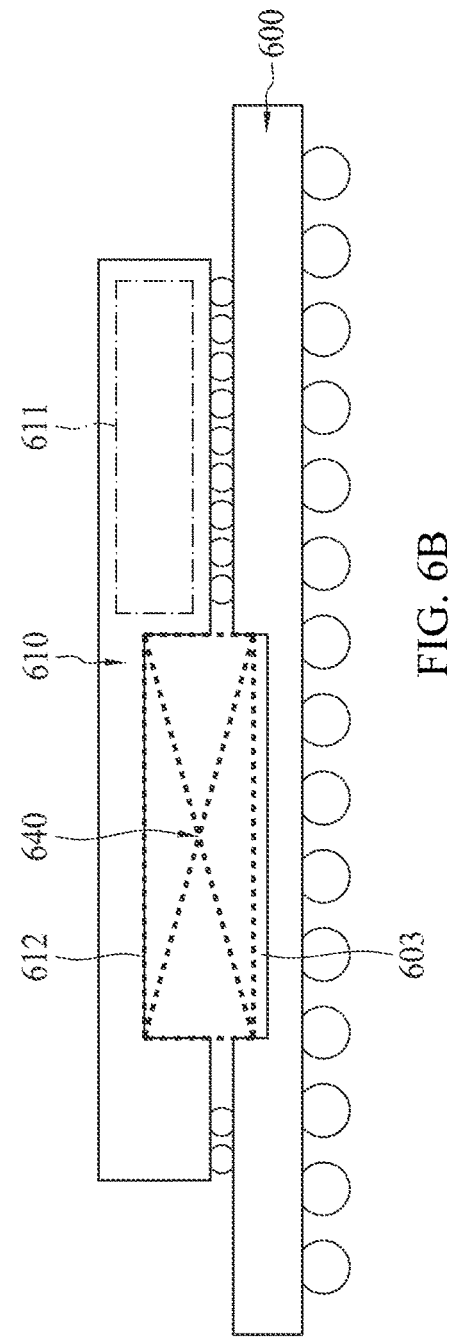
FIG. 6B is a schematic view of another package structure of the present disclosure.

FIG. 6A is a schematic view of another substrate 600 of the present disclosure, FIG. 6B is a schematic view of another package structure 6 of the present disclosure.

As shown in FIGS. 6A and 6B, the package structure 6 includes a substrate 600, a chip 610 and an optical module 640. The chip 610 and the optical module 640 are similar to the chip 210 and the optical module 220 in FIG. 2, FIG. 3A, FIG. 3B, FIG. 4A and FIG. 4B in structure, and will not be repeatedly described herein.

A difference between the package structure 6 and the package structure 2 of FIG. 2, FIG. 3A and FIG. 3B lies in that, the substrate 600 has an optical waveguide connection assembly recessed portion 602 and an optical module recessed portion 603. The optical waveguide connection assembly recessed portion 602 is provided outside a region on the substrate 600 where the substrate 600 overlaps with the chip 610, and the optical module recessed portion 603 is provided in the region on the substrate 600 where the substrate 600 overlaps with a recessed portion 612 of the chip 610. However, this is not intended as limitation, the optical waveguide connection assembly recessed portion 602 may be at least partially provided outside the region on the substrate 600 where the substrate 600 overlaps with the chip 610, the optical module recessed portion 603 may be at least partially provided in the region on the substrate 600 where the substrate 600 overlaps with the recessed portion 612 of the chip 610. The optical module 640 is provided on the chip 610 and extends into the optical module recessed portion 603. It is noted that, that the optical waveguide connection assembly recessed portion 602 and the optical module recessed portion 603 are communicated is taken as an example for description, but this is not intended as limitation. The optical waveguide connection assembly recessed portion 602 and the optical module recessed portion 603 may be not communicated with each other, for example, a part of the substrate 600 is positioned between the optical waveguide connection assembly recessed portion 602 and the optical module recessed portion 603 to isolate the optical waveguide connection assembly recessed portion 602 and the optical module recessed portion 603. Moreover, in some embodiments, only the optical waveguide connection assembly recessed portion 602 or the optical module recessed portion 603 may be provided on the substrate 600.

Therefore, in addition to that the package structure 6 has the above functions as the package structure 2, when a size of the optical waveguide connection assembly 9 is larger and the optical waveguide connection assembly 9 (as shown in FIG. 5B) can be connected with the chip 610 in form of being suspended by means of the optical waveguide connection assembly recessed portion 602 of the substrate 600, the optical waveguide connection assembly 9 will not be affected by the substrate 600 and can extend into the optical waveguide connection assembly recessed portion 602 of the substrate 600, so that it can avoid the optical waveguide connection assembly 9 contacting the substrate 600 and can allow the optical fiber 91 (as shown in FIG. 5B) of the optical waveguide connection assembly 9 to be more accurately mated with the optical waveguide structure 611 of the chip 610. With the optical module recessed portion 603 of the substrate 600, for example, a required depth of the recessed portion 612 of the chip 610 can be reduced, and a receiving space between the substrate 600 and the chip 610 for receiving the optical module 640 can also be increased. In other words, the recessed portion 612 of the chip 610 and the optical module recessed portion 603 of the substrate 600 may be cooperated with each other to form the receiving space for receiving the optical module 640, as a result, the depth of the recessed portion 612 or a depth of the optical module recessed portion 603 may be adjusted as required (for example, the recessed portion 612 is made shallow and the optical module recessed portion 603 is made deeper correspondingly, etc. al.), while the required space for receiving the receiving optical module 640 is maintained.

Figure 7:
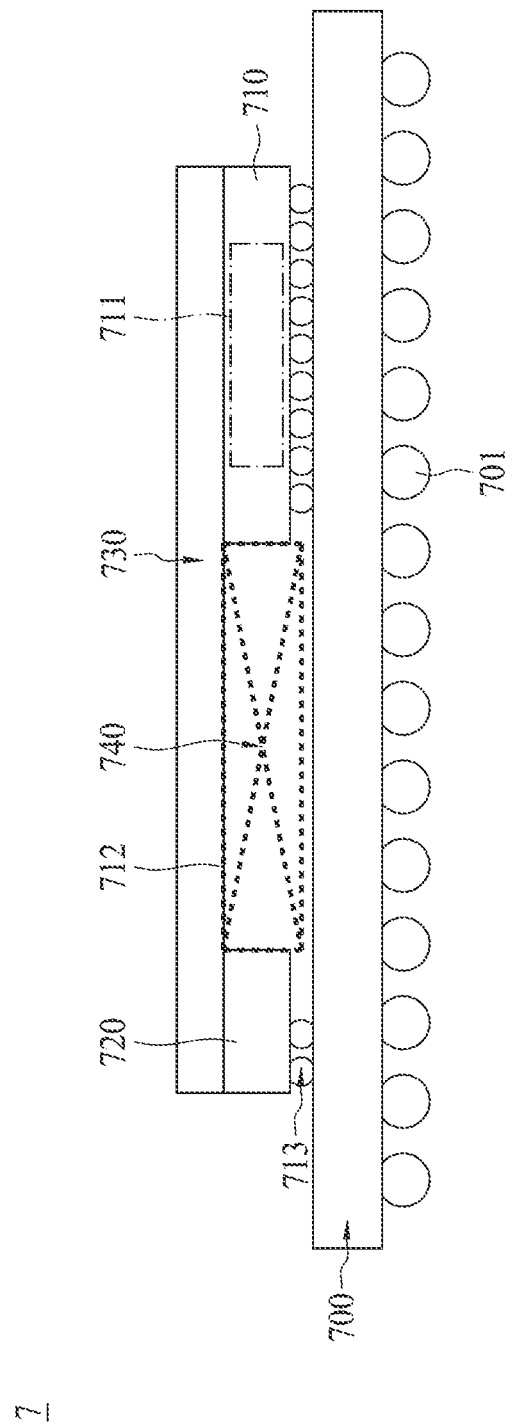
FIG. 7 is a schematic view of another package structure of the present disclosure.

FIG. 7 is a schematic view of another package structure 7 of the present disclosure. In some embodiments, the package structure 7 includes a substrate 700, a first chip 710, a second chip 720, a third chip 730 and an optical module 740. The substrate 700 is, for example, a circuit board, the circuit board has a circuit structure, the circuit structure may be for example but not limited to a multilayer circuit structure or other suitable circuit structures. In some embodiments, a plurality of bumps or solder balls 701 may be provided on a surface of the substrate 700 which is opposite to a surface of the substrate 700 on which the first chip 710, the second chip 720 and the third chip 730 are provided, so that the substrate 700 can be electrically connected with other elements.

The first chip 710, the second chip 720, and the third chip 730 may be the same chips or different chips. The first chip 710 is engaged to the substrate 700 by flip chip, the second chip 720 is engaged to the substrate 700 by flip chip and is spaced apart from the first chip 710, and the third chip 730 is provided on the first chip 710 and the second chip 720. In some embodiments, the third chip 730 is engaged to the first chip 710 and the second chip 720 by flip chip. In some embodiments, the third chip 730 is electrically connected with the first chip 710 and/or the second chip 720.

In some embodiments, the first chip 710 and the second chip 720 may be dummy chips which are used to form a space 712 together with the third chip 730. In some embodiments, the third chip 730 is stacked on the first chip 710 and the second chip 720 and is not electrically connected with the first chip 710 and/or the second chip 720. In other embodiments, the first chip 710, the second chip 720 and the third chip 730 may be chips having different functions and at the same time together form a space 712. Any or all of the first chip 710, the second chip 720, and the third chip 730 each may have an optical waveguide structure 711. In the example, that the first chip 710 has the optical waveguide structure 711 is taken as an example for description, but this is not intended as limitation. The optical waveguide structure 711 is adjacent to the space 712, and the space 712 faces the substrate 700. In other words, the space 712 is positioned among the first chip 710, the second chip 720, and the third chip 730 and the substrate 700, and the optical waveguide structure 711 is positioned at a side of the space 712 (for example, the optical waveguide structure 711 is provided to the first chip 710). In addition, it is noted that, the structure of the optical waveguide structure 711 is not intended as limitation. In some embodiments, a plurality of micro bumps or micro solder balls 713 are provided between the first chip 710 and the second chip 720 and the substrate 700 to electrically connect the first chip 710 and the second chip 720 with the substrate 700. For example, the first chip 710, the second chip 720, and the third chip 730 each may be a flip-chip type photonic integrated circuit.

The optical module 740 is provided to the third chip 730, and is positioned between the substrate 700 and the third chip 730. The optical module 740 is positioned in the space 712 formed by the first chip 710, the second chip 720 and the third chip 730, and is electrically connected with the third chip 730 and the substrate 700. The optical module 740 may include a light source and a lens, and a light generated by the light source passes through the lens and is incident to the first chip 710, the second chip 720 or the third chip 730. The optical module 740 is similar to the optical module 220 of FIG. 2, FIG. 3A, FIG. 3B, FIG. 4A and FIG. 4B in structure, and will not be repeatedly described herein.

In conclusion, in the package structure 7 of the present disclosure, the space 712 is formed by the first chip 710, the second chip 720 and the third chip 730, and the optical module 740 is provided in the space 712. Therefore, because the first chip 710, the second chip 720 and the third chip 730 of the package structure 7 can be connected by that the first chip 710, the second chip 720 and the third chip 730 are engaged by flip chip, the problem that the radio frequency performance is affected by the length of the bonding wire when wire bonding is used can be avoided. That is, in the package structure 7, an fault tolerance rate of the first chip 710, the second chip 720, the third chip 730, the optical module 740 and the substrate 700 is higher than the error tolerance rate of the existing package structure 1 (as shown in FIG. 1) in relative position. Moreover, the package structure 7 does not need to be fixed to the circuit board via a carrier (not shown), and the degree of freedom of reworking of the package structure 7 can also be increased.

In addition, in the package structure 7 of the present disclosure, the optical module 740 is, for example, provided in the space 712 formed by the first chip 710, the second chip 720 and the third chip 730, so an electrical signal path of the optical module 740 can be different from an electrical signal path of the first chip 710, the second chip 720 and the third chip 730 to avoid generation of crosstalk. Moreover, the package structure 7 of the present disclosure may not need to provide an optical fiber for an optical path of an incident light and an optical fiber for an optical path of an emitted light, so that the cost is decreased.

Figure 8:
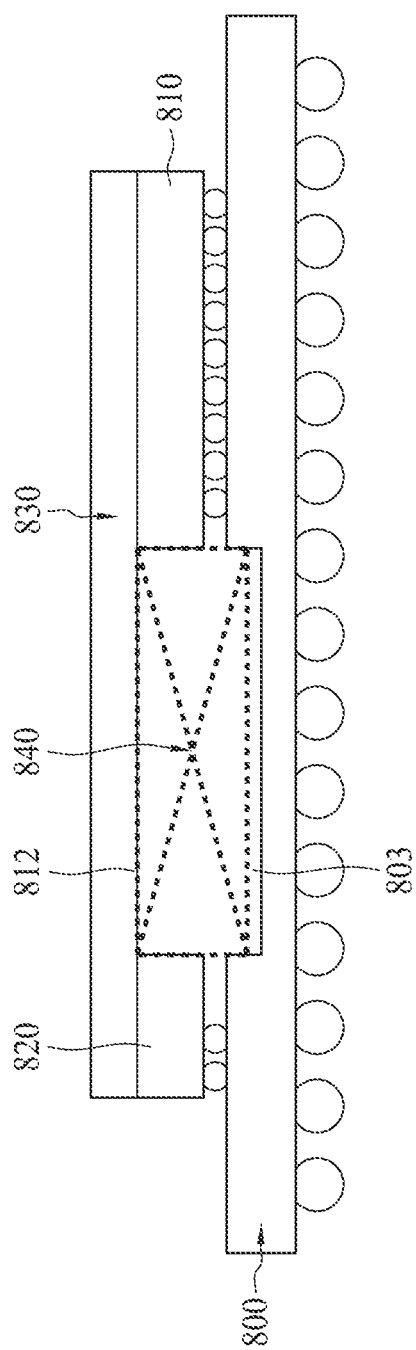
FIG. 8 is a schematic view of another package structure of the present disclosure.

FIG. 8 is a schematic view of another package structure 8 of the present disclosure. As shown in FIG. 8, the package structure 8 includes a substrate 800, a first chip 810, a second chip 820, a third chip 830 and an optical module 840. The first chip 810, the second chip 820, the third chip 830 and the optical module 840 are similar to the first chip 710, the second chip 720, the third chip 730 and the optical module 740 of FIG. 7 in structure, and will not be repeatedly described herein.

A difference between the package structure 8 and the package structure 7 of FIG. 7 lies in that, the substrate 800 has an optical module recessed portion 803, the optical module recessed portion 803 is provided in a region on the substrate 800 where the substrate 800 overlaps with the space 812 formed by the first chip 810, the second chip 820 and the third chip 830. However, this is not intended as limitation. The optical module recessed portion 803 also may be at least partially provided in the region on the substrate 800 where the substrate 800 overlaps the space 812 formed by the first chip 810, the second chip 820 and the third chip 830.

Therefore, in addition to that the package structure 8 has the above functions as the package structure 7, with the region where the optical module recessed portion 803 of the substrate 800 overlaps with the space 812, for example, a receiving space between the substrate 800, the first chip 810, the second chip 820 and the third chip 830 for receiving the optical module 840 can be increased. Furthermore, a thickness of the first chip 810 and a thickness of the second chip 820 can be adjusted as required (for example, the first chip 810 and the second chip 820 is made thinner and the space 812 shallower, and the optical module recessed portion 803 is made deeper correspondingly, etc. al), while the required space for receiving the optical module 840 is maintained.

Figure 9:
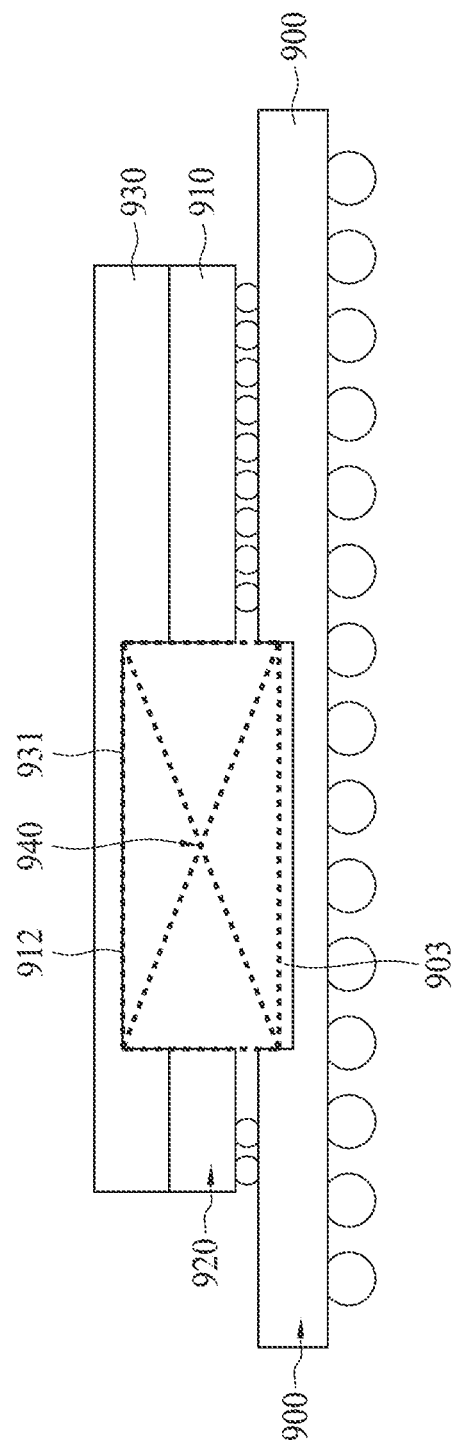
FIG. 9 is a schematic view of another package structure of the present disclosure.

FIG. 9 is a schematic view of another package structure 9 of the present disclosure. As shown in FIG. 9, the package structure 9 includes a substrate 900, a first chip 910, a second chip 920, a third chip 930 and an optical module 940. The first chip 910, the second chip 920 and the optical module 940 are similar to the first chip 910, the second chip 920 and the optical module 940 of FIG. 7 in structure, and will not be repeatedly described herein.

A difference between the package structure 9 and the package structure 7 of FIG. 7 and the package structure 8 of FIG. 8 lies in that, the substrate 900 has an optical module recessed portion 903, and the third chip 930 also has a recessed portion 931. The optical module recessed portion 903 is provided in a region on the substrate 900 where the substrate 900 overlaps with the recessed portion 931 of the third chip 930, butt this is not intended as limitation, the optical module recessed portion 903 may be provided at least partially in the region on the substrate 900 where the substrate 900 overlaps with the recessed portion 931 of the third chip 930.

Therefore, in addition to that the package structure 9 has the above functions as the package structure 7 and the package structure 8, by that the third chip 930 also has the recessed portion 931, for example, the receiving space among the substrate 900, the first chip 910, the second chip 920 and the third chip 930 for receiving the optical module 940 can be increased. Furthermore, a thickness of the first chip 910 and a thickness of the second chip 920 can be adjusted as required (for example, the first chip 910 and the second chip 920 are made thinner and in turn make a space between first chip 910 and the second chip 920 shallower, and the optical module recessed portion 903 and the recessed portion 931 are made deeper correspondingly, etc. al), while the required space for receiving the optical module 940 is maintained.

In addition, it is noted that, like that the substrate 600 has the optical waveguide connection assembly recessed portion 602 shown in FIG. 6A, the substrate 700 of FIG. 7, the substrate 800 of FIG. 8 and the substrate 900 of FIG. 9 each also may have an optical waveguide connection assembly recessed portion (not shown), and the optical waveguide connection assembly recessed portion is provided at least partially in a region on the substrate 700, 800, 900 where the substrate 700, 800, 900 overlaps with the first chip 710, 810, 910, the second chip 820, 820, 920 and the third chip 730, 830, 930, so that the optical waveguide connection assembly 9 (as shown in FIG. 5B) can extend into the optical waveguide connection assembly recessed portion.

Figure 10B:
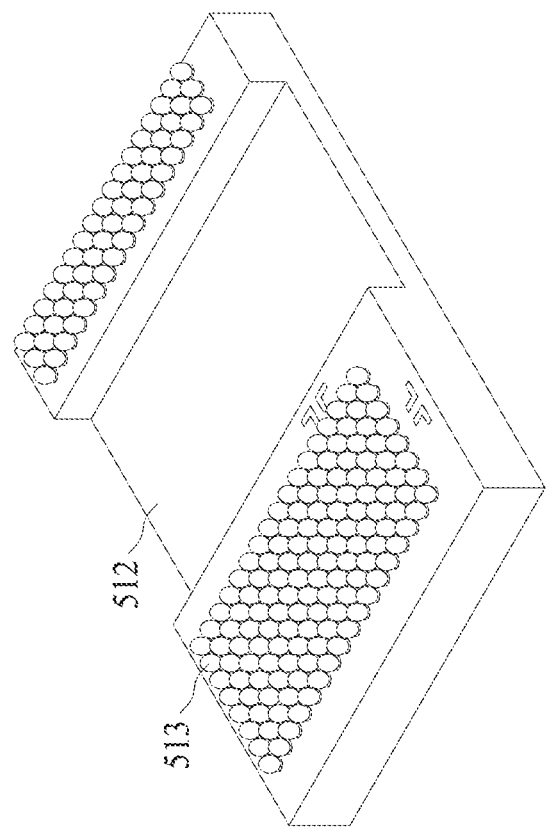
FIG. 10A to FIG. 10F are schematic views of a manufacturing process of a package structure as shown in FIG. 5A and FIG. 5B according to the present disclosure.
Figure 10A:
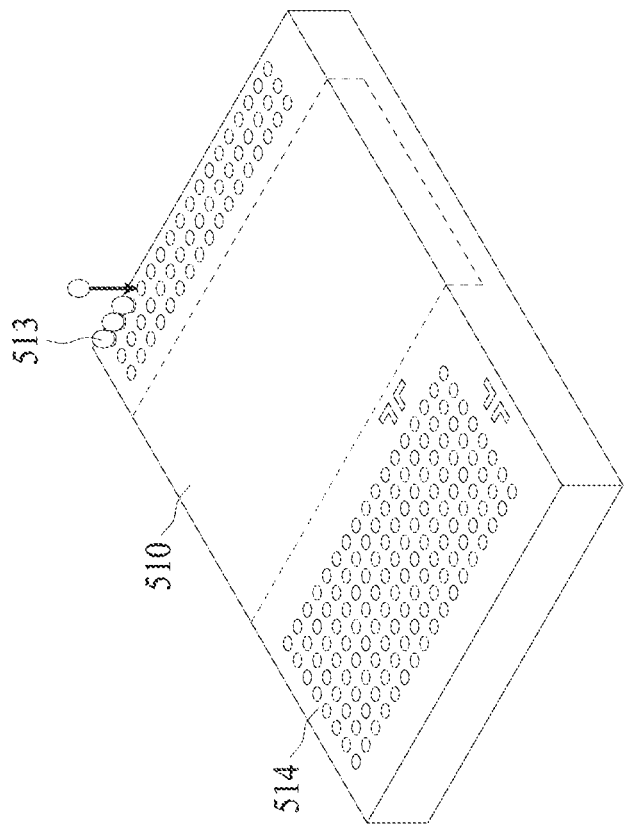

FIG. 10A to FIG. 10F are schematic views of a manufacturing process of the package structure 5 as shown in FIG. 5A and FIG. 5B according to the present disclosure. As shown in FIG. 10A, a plurality of soldering pads 514 and a plurality of micro bumps or micro solder balls 513 can be formed on the chip 510 first. As shown in FIG. 10B, next, a recessed portion 512 is formed on the chip 510 by etching. For example, the etching method may be dry etching or wet etching.

It is noted that, for the package structure 7 as shown in FIG. 7 and the package structure 8 as shown in FIG. 8, it does not need to form a recessed portion on the chips, and a space similar to the recessed portion can be formed by that the chips cooperate with each other. For the package structure 9 shown in FIG. 9, the third chip 930 may be formed with the recessed portion 931 first, and then the third chip 930 is engaged with the first chip 910 and the second chip 920.

Figure 10D:
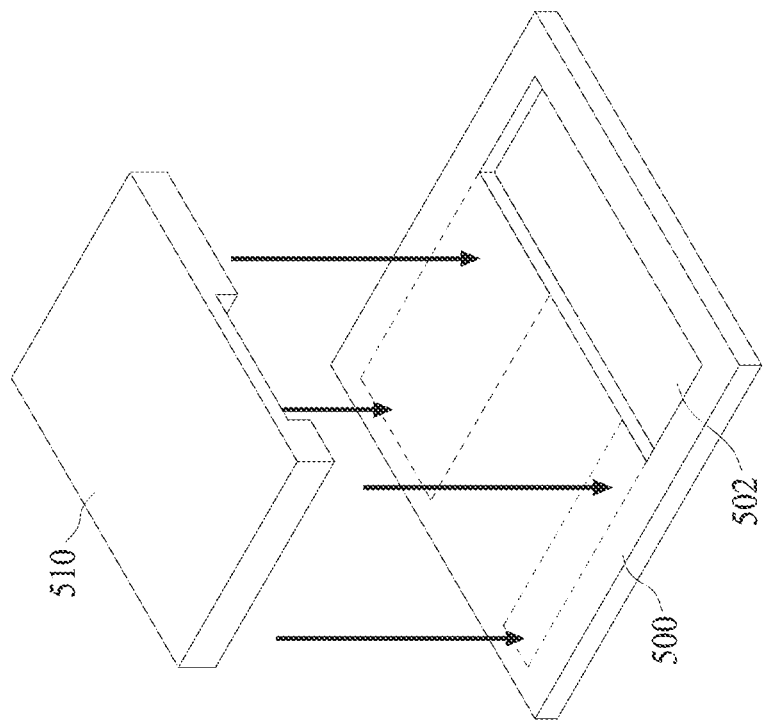
Figure 10C:
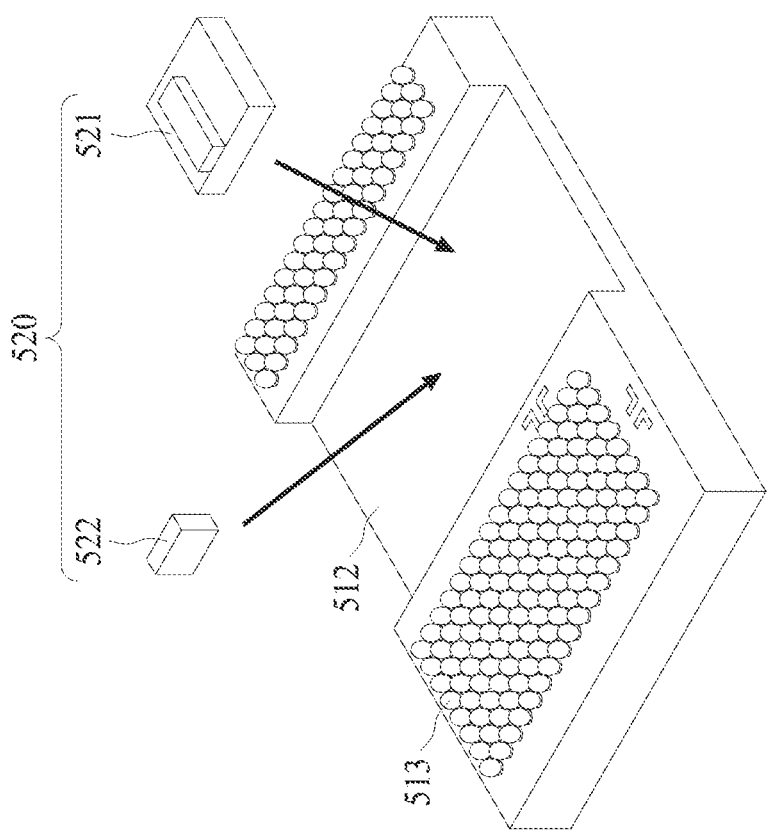

As shown in FIG. 10C, the optical module 520 is provided in the recessed portion 512. For example, the optical module 520 may have a light source 521 and a lens 522, and a position of the optical module 520 provided in the recessed portion 512 is not intended as limitation. As shown in FIG. 10D, the chip 510 is engaged to the substrate 500 by flip chip, and the substrate 500 may first be provided with an optical waveguide connection assembly recessed portion 502. It is noted that, a substrate does not have a recessed portion as the substrate 200 shown in FIG. 2, or may have an optical waveguide connection assembly recessed portion 602 and an optical module recessed portion 603 as the substrate 600 shown in FIG. 6A. The optical waveguide connection assembly recessed portion 602 and the optical module recessed portion 603 have been described in detail with respect to FIG. 6A and FIG. 6B, and will not be repeatedly described herein.

Figure 10F:
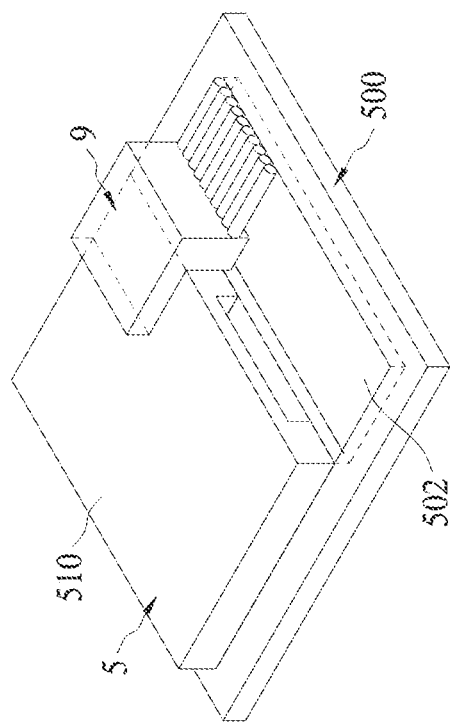
Figure 10E:
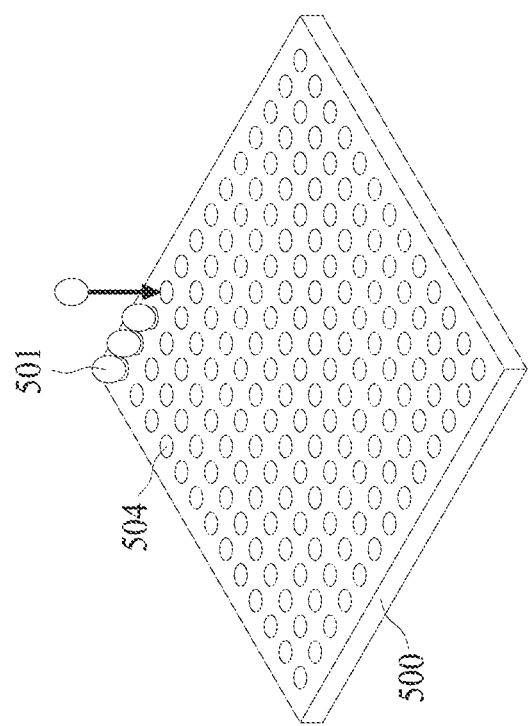

As shown in FIG. 10E, a plurality of soldering pads 504 and a plurality of bumps or solder balls 501 are provided on a surface of the substrate 500 opposite to a surface of the substrate 500 on which the chip 510 is provided, so that the package structure 5 can be electrically connected with other elements. As shown in FIG. 10F, the optical waveguide connection assembly 9 is connected with the package structure 5. In some embodiments, the optical waveguide connection assembly 9 may be provided on the chip 510 in form of being suspended and extends into the optical waveguide connection assembly recessed portion 502 of the substrate 500.

It is noted that, the above process steps are not intended as limitation and can have different sequences according to different needs, and the process steps can be increased or decreased according to different structural designs.

While the present disclosure and advantages thereof are described in detail, it is understood that various changes, replacements and substitutions may be made without departing from the spirit and scope of the present disclosure defined by the appended claims. For example, many processes described above can be implemented in a variety of ways, and many processes described above can be replaced with other processes or combinations thereof.

Further, the scope of the present disclosure is not limited to the specific embodiments of process, machinery, manufacturing, substance composition, means, method or step described in the specification. Those skilled in the art can understand from the disclosed contents of the present disclosure that existing or future developed process, machinery, manufacturing, substance composition, means, method or step which has the same function or achieve essentially the same result as the corresponding embodiment described herein can be used in accordance with the present disclosure. Accordingly, such a process, machinery, manufacturing, substance composition, mean, method or step is included in the technical solution of the present disclosure.

What is claimed is:

1. A package structure, comprising:
   a substrate;
   a chip which has an optical waveguide structure and an optical module recessed portion, the optical waveguide structure being adjacent to the optical module recessed portion, the optical module recessed portion facing the substrate, the chip being engaged to the substrate by flip chip; and
   an optical module which is provided in the optical module recessed portion of the chip, wherein the optical module comprises a light source and a lens, the light source generates a light that passes through the lens and is emitted to the optical waveguide structure that is enclosed in the chip, and wherein an optical path of the light is located on a plane that is substantially parallel to the substrate, and a first electrical signal path of the optical module is different from a second electrical signal path of the chip,
   wherein the chip is connected with an optical waveguide connection assembly, the substrate has an optical waveguide connection assembly recessed portion, and the optical waveguide connection assembly extends into the optical waveguide connection assembly recessed portion; and
   wherein the optical waveguide connection assembly is connected with the chip in form of being suspended, to make the optical waveguide connection assembly separate from the substrate.

2. The package structure of claim 1, wherein the substrate has an optical module recessed portion, and the optical module extends into the optical module recessed portion.

3. The package structure of claim 1, wherein the light is incident to the optical waveguide structure along the optical path of an L shape via the lens.

4. The package structure of claim 1, wherein the chip is a flip-chip type photonic integrated circuit.

5. The package structure of claim 1, wherein the optical waveguide connection assembly comprises a first section and a second section connected with the first section, the first section being disposed on a top surface of the chip, and the second section extending into the optical waveguide connection assembly recessed portion along a side surface of the chip and separating from the substrate.

6. An optical device, configured to be connected with a chip that is engaged to a substrate;
   wherein the optical device comprises:
      a light source;
      a lens, wherein the light source generates a light that passes through the lens and is emitted to an optical waveguide structure that is enclosed in the chip, and wherein an optical path of the light is located on a plane that is substantially parallel to the substrate, and a first electrical signal path of the optical device is different from a second electrical signal path of the chip; and
      an optical waveguide connection assembly, configured to be connected with the chip, wherein the optical waveguide connection assembly extends into an optical waveguide connection assembly recessed portion of the substrate, and wherein the optical waveguide connection assembly is connected with the chip in form of being suspended, to make the optical waveguide connection assembly separate from the substrate.

7. The optical device of claim 6, wherein the light is incident to the optical waveguide structure along the optical path of an L shape via the lens.

8. The optical device of claim 7, wherein the light is emitted to an optical fiber connected with the chip.

9. The optical device of claim 8, wherein the light source is electrically connected with the substrate via the chip, wherein the chip is engaged to the substrate by flip chip.

10. A package structure, comprising:
    a substrate;
    a chip which has an optical waveguide structure and a first optical module recessed portion, the optical waveguide structure being adjacent to the recessed portion, the recessed portion facing the substrate, the chip being engaged to the substrate by flip chip; and
    an optical module, comprising a light source and a lens, the light source generates a light that passes through the lens and is emitted to the optical waveguide structure that is enclosed in the chip, and wherein an optical path of the light is located on a plane that is substantially parallel to the substrate, and a first electrical signal path of the optical module is different from a second electrical signal path of the chip, wherein the chip is connected with an optical waveguide connection assembly, the substrate comprises an optical waveguide connection assembly recessed portion and a second optical module recessed portion, the optical waveguide connection assembly extends into the optical waveguide connection assembly recessed portion, and the optical waveguide connection assembly recessed portion and the second optical module recessed portion are communicated with each other.

11. The package structure of claim 10, wherein the optical waveguide connection assembly recessed portion is at least partially disposed outside a region on the substrate where the substrate overlaps with the chip, and the second optical module recessed portion is at least partially disposed in a region on the substrate where the substrate overlaps with the recessed portion of the chip.

\* \* \* \* \*